United States Patent [19]

Meulenberg et al.

[11] Patent Number: 4,611,367

[45] Date of Patent: Sep. 16, 1986

[54] HOOK KEEPER FOR BELT LACINGS

[75] Inventors: John H. Meulenberg, Jenison; Roy A. McKeage, Grand Rapids, both of Mich.

[73] Assignee: Clipper Belt Lacer Company, Grand Rapids, Mich.

[21] Appl. No.: 747,166

[22] Filed: Jun. 21, 1985

[51] Int. Cl.$^4$ ............................................. F16G 3/02
[52] U.S. Cl. .................... 24/33 P; 24/33 B; 24/33 C; 24/33 M
[58] Field of Search .................. 24/33 P, 33 R, 33 A, 24/33 F, 33 B, 33 K, 33 M, 33 V, 33 C, 31 R, 31 F; 139/383 AA

[56] References Cited

U.S. PATENT DOCUMENTS

| 276,620 | 5/1883 | Nye . | |
|---|---|---|---|
| 831,050 | 9/1906 | Flanagan . | |
| 1,498,275 | 6/1924 | Hartley . | |
| 1,614,751 | 1/1927 | Mitchell | 24/33 C |
| 1,710,431 | 11/1927 | Schnelle . | |
| 1,768,935 | 12/1928 | Schnelle . | |
| 1,789,191 | 11/1929 | Richard . | |
| 2,050,899 | 8/1936 | Shippert et al. | 24/33 V |
| 2,068,826 | 1/1937 | Timmerbeil . | |
| 2,179,697 | 11/1939 | Kremer | 24/33 P |
| 2,185,563 | 1/1940 | Palmer | 24/33 M |
| 2,228,926 | 1/1941 | Matthaei et al. . | |
| 2,851,753 | 9/1958 | McComb | 24/33 M |
| 3,438,096 | 4/1969 | McComb | 24/33 B |

FOREIGN PATENT DOCUMENTS

| 620206 | 9/1935 | Fed. Rep. of Germany . | |
|---|---|---|---|
| 503707 | 6/1920 | France | 24/33 B |
| 579494 | 8/1916 | United Kingdom . | |
| 580718 | 9/1946 | United Kingdom . | |

OTHER PUBLICATIONS

"Round Baler 1850," Gehl Company, West Bend, Wisconsin 53095.

Primary Examiner—Victor N. Sakran
Attorney, Agent, or Firm—Price, Heneveld, Huizenga & Cooper

[57] ABSTRACT

A hook keeper is provided to protect and reinforce belt lacings of the type having a plurality of hooks clenched in opposite ends of a belt, with the loop ends of the hooks meshed together and interconnected by a pin. The hook keeper has a rigid body with at least two side-by-side slots therethrough. The hook keeper is positioned between the connecting pin and an associated end of the belt, and preferably reinforces one of the two outermost hooks in the lacing. The selected outermost lacing hook is closely received in one of the keeper slots, and another one of the lacing hooks is closely received in the second keeper slot. Forces acting on the outermost hook are transmitted to and resisted at least partially by the second hook to improve the strength and longevity of the lacing.

51 Claims, 9 Drawing Figures

U.S. Patent  Sep. 16, 1986  4,611,367
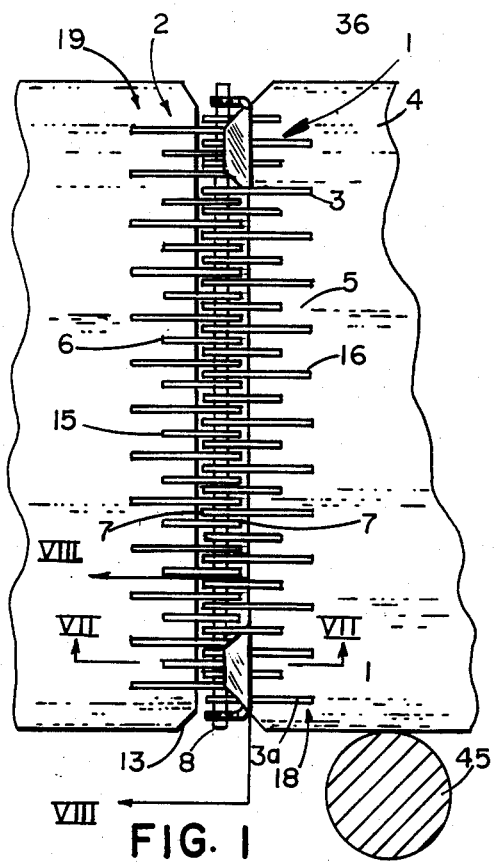
FIG. 1
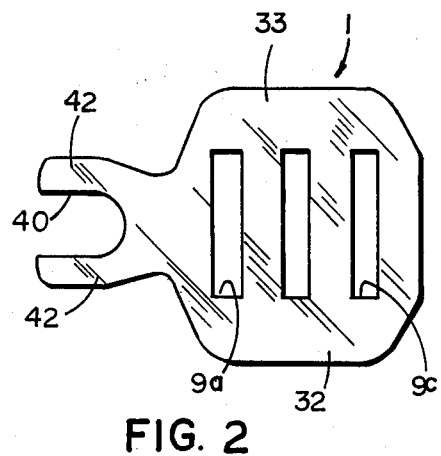
FIG. 2
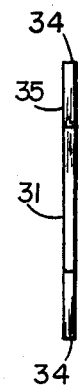
FIG. 3
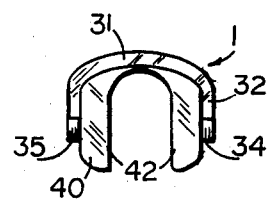
FIG. 4
FIG. 6
FIG. 5
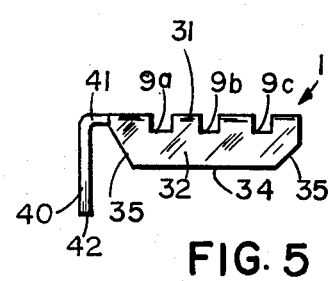
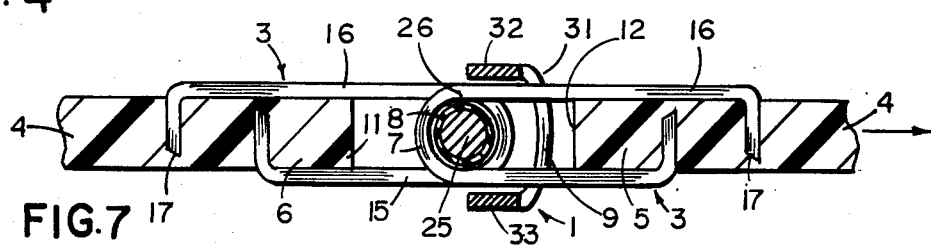
FIG. 7
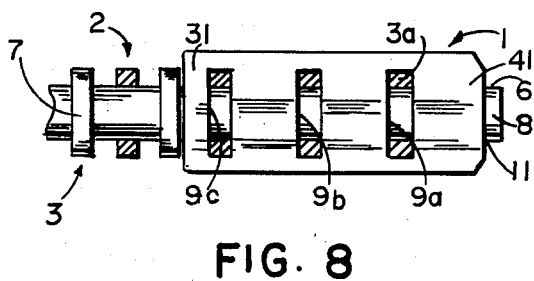
FIG. 8
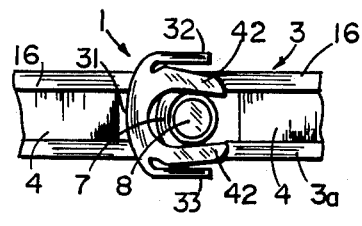
FIG. 9

HOOK KEEPER FOR BELT LACINGS

BACKGROUND OF THE INVENTION

The present invention relates to lacings for belts, such as conveyor belts, power drive belts, and the like, and in particular to a hook keeper therefor.

Endless belts are used extensively in a wide variety of different commercial and industrial applications. Conveyor belts and power drive belts are particularly prevalent in agricultural equipment, airport baggage conveyor systems, mining conveyors, and many other similar systems.

The ends of such endless belts are typically interconnected by a lacing, which is usually flexible to permit the belt to pass over pulleys. One common type of lacing is illustrated and described in U.S. Pat. Nos. 1,498,275 and 2,068,826, and comprises a plurality of wire-like hooks that have points on opposite legs clenched or embedded in the leading and trailing ends of the belt. The loop ends of the hooks are meshed together, and a pin extends through the meshed loops to interconnect the opposite ends of the belt. Such hook-type lacings provide great flexibility, which compensates for slight misalignment while providing smooth hinge action, and have experienced widespread use and acceptance.

One problem experienced with hook-type lacings is that the outermost hooks tend to separate laterally from the lacing, thereby shifting additional stress onto the remaining hooks. In general, as the lacing wears, the outermost hooks tend to pivot laterally outwardly away from the center of the lacing, and slide off of the connecting pin. This type of deterioration not only increases the strain on the remaining hooks in the lacing, but also exposes the next outermost hook, which is typically located on the trailing side of the belt. Hence, if the belt should engage any type of obstruction, or rub against a belt guide or the like, the hook on the trailing side of the belt can be easily torn or peeled off of the lacing, such that the hooks generally fail in pairs. The load on the remaining hooks ultimately increases to a point where the entire lacing pulls apart or unzips.

The premature failure of hook-type lacings is a particular problem when the belt is under high tension loading. The ends of the belt tend to bow in plan elevation under such circumstances, thereby applying additional stress on the outermost lacing hooks.

Another problem which exacerbates premature lacing failure is the rubbing of the side edges of the belt against belt guides or the like, which can be caused by a variety of situations, such as unsquare belt ends, slight misalignment between the drive and driven pulleys, or non-uniform belt loading. Under such circumstances the belt has a tendency to move transversely off of the pulleys. In order to ensure that the drive belt always remains aligned with the pulleys, belt guides or alignment posts are fixedly mounted in the machine at locations adjacent to the opposite side edges of the belts. Abutment between such alignment posts and the side edges of the drive belt can be very damaging to the lacing, and result in premature failure. Post type belt guides can impart shock loading to the lacing, which is particularly damaging.

One particular example of such problems in hook-type lacings pertains to round hay balers, such as the machine illustrated in the Gehl "Round Baler 1850" brochure identified in the Disclosure Statement. In round hay balers, a plurality of belts are used to compress hay into large, cylindrically shaped bales. The tension in the baling belts is extremely high in order to form very compact bales. A plurality of belt guides and alignment posts are provided at various locations along the serpentine path of belt translation in order to maintain proper lateral positioning of the belts. These two conditions, particularly when experienced in combination, create a rather severe application for the lacings that interconnect the ends of the bale forming belts.

SUMMARY OF THE INVENTION

One aspect of the present invention is to provide a hook keeper to protect and reinforce belt lacings of the type having a plurality of hooks clinched in opposite ends of a belt, with the loop ends of the hooks meshed together and interconnected by a pin. The hook keeper has a rigid body with at least two, side-by-side slots therethrough. The hook keeper is positioned between the connecting pin and an associated end of the belt, and preferably reinforces at least one of the two outermost hooks on the opposite sides of the lacing. The selected outermost lacing hook is closely received in one of the keeper slots, and at least one other of the lacing hooks is closely received in the second keeper slot. Hence, forces acting on the selected outermost hook are transmitted to and resisted at least partially by the second hook to improve the strength and longevity of the lacing.

In one example of the present invention, the keeper is mounted on the leading side of the lacing, and has a U-shaped transverse cross-sectional shape which faces away from the leading side of the lacing, and covers at least a portion of the hook loops on the trailing side of the lacing to protect the same. The keeper slots may be positioned to laterally interconnect the outermost hook with an immediately adjacent hook on the leading side of the lacing. The keeper may include a clip, which is crimped onto the connector pin to at least temporarily retain the lateral position of the connector pin in the lacing.

The principal objects of the present invention are to provide a hook keeper for belt lacings to prolong the normal life of the lacing, and also to prevent premature failure of the lacing. The hook keeper does not interfere with the operation of the belt, or adversely affect the flexibility of the lacing. The hook keeper has an uncomplicated design which is not only relatively inexpensive to manufacture, but is also easy to install, even by unskilled personnel without any special tools. The hook keeper is particularly adapted to be installed in the field by the equipment operator. The hook keeper is particularly well adapted to protect and reinforce belt lacings used in high tension and/or high abuse environments.

These and other features, advantages, and objects of the present invention will be further understood and appreciated by those skilled in the art by reference to the following written specification, claims and appended drawings.

BRIEF DESCRIPTION OF THE DRAWINGS

FIG. 1 is a top plan view of a hook keeper embodying the present invention, shown installed in a lacing on a belt.

FIG. 2 is an enlarged, top plan, developed view of the hook keeper.

FIG. 3 is an end view of the developed hook keeper shown in FIG. 2.

FIG. 4 is an enlarged, rear elevational view of the hook keeper.

FIG. 5 is an enlarged, side elevational view of the hook keeper.

FIG. 6 is an enlarged, end elevational view of the hook keeper.

FIG. 7 is an enlarged, vertical cross-sectional view of the hook keeper and lacing, taken along the line VII—VII of FIG. 1.

FIG. 8 is an enlarged, fragmentary, vertical cross-sectional view of the keeper and lacing, taken along the line VIII—VIII of FIG. 1.

FIG. 9 is an enlarged, end elevational view of the keeper and lacing shown in FIG. 8.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary.

The reference numeral 1 (FIG. 1) generally designates a hook keeper embodying the present invention. Hook keeper 1 is adapted to protect and reinforce belt lacings 2, and the like, of the type having a plurality of hooks 3 clenched in a belt 4 at the leading end 5 and trailing end 6 of belt 4. Lacing hooks 3 have outer loop ends 7 that are meshed together, and interconnected by a pin 8. Hook keeper 1 has a rigid body with at least two side-by-side slots 9 (FIG. 2) therethrough. Hook keeper 1 is positioned between connecting pin 8 (FIG. 1), and an associated end of belt 4, and preferably reinforces at least one of the two outermost hooks 3 on the opposite sides of lacing 2. In the example illustrated in FIG. 1, both of the outermost hooks 3a and 3b in belt lacing 2 are reinforced by a hook keeper 1. In each of the outer lacing hooks 3a and 3b, the legs of the hooks are closely received in one of the keeper slots 9, and another one of the lacing hooks 3 is closely received in the second keeper slot 9, such that forces acting on each of the outer hooks 3a and 3b are transmitted to and resisted at last partially by the second hook 3 in the keeper to improve the strength and longevity of belt lacing 2.

As best illustrated in FIGS. 1 and 7, belt 4 may have a conventional construction, and may be used in conjunction with all different types of machinery applications, such as power drive belts, conveyor belts, and the like. The illustrated belt 4 is particularly adapted for use in conjunction with agricultural round balers. One working example of belt 4 has a width of approximately 4inches, a thickness in the range of ⅛ to ⅜ inches, a length of over thirty feet, and is constructed of a reinforced rubber material. The end edges 11 and 12 of belt 4 are generally square, and have chamfered corners 13.

The illustrated belt lacing 2 is a hook-type of lacing, having a conventional construction. Each hook 3 (FIG. 7) has a short leg 15 and a long leg 16, with a point 17 at the outer end of each leg. In the illustrated example, hooks 3 are arranged in a double staggered group pattern. Those hooks 3 clenched in the leading end 5 of belt 4 collectively define a leading side 18 of belt lacing 2. Those hooks 3 clenched in the trailing end 6 of belt 4 ccollectively define a trailing side 19 of belt lacing 2.

The two hooks 3 that are located at the opposite, outermost ends of belt lacing 2 are designated by the reference numerals 3a and 3b respectively. Outermost hooks 3a and 3b are identical in construction to the remaining hooks 3, but are simply located at the outermost ends of belt lacing 2. In the present example, outermost hooks 3a and 3b are clenched in the leading end 5 of belt 4, and therefore define a portion of the leading side 18 of belt lacing 2. Hooks 3 may have a wide variety of different sizes and shapes, such as square, rectangular, round, etc., and are constructed of different materials, including high carbon steel. Hooks 3 are generally selected in accordance with the specific lacing application.

The illustrated connecting pin (FIGS. 7-9) is also of a substantially conventional construction, and comprises a braided wire core 25, with an exterior protective coating or layer 26 encasing core 25. Protective layer 26 is preferably constructed of a synthetic resin material, such as nylon or the like, and may be molded on core 25.

Hook keeper 1 (FIGS. 4–6) has a rigid body 30 which serves to releasably engage and abuttingly retain two of the lacing hooks 3, so as to reinforce the belt lacing 2. In the illustrated example, keeper body 30 has a generally U-shaped transverse cross-sectional configuration, which defines a web 31 and opposite flanges 32 and 33. Web 31 has a generally arcuate shape which conforms to the exterior surfaces of the loop ends 7 of hooks 3, as best shown in FIG. 7. Flanges 32 and 33 are mutually parallel, and are spaced apart a distance slightly greater than the outside surfaces of the adjacent hook legs 15 and 16. Keeper flanges 32 and 33 have a length which covers the hook loops on the opposite side of lacing 2, and include end edges 34 with chamfered corners 35 to help prevent snagging. In general, keeper 1 is designed for use in conjunction with a particular size and shape of lacing, taking into consideration the size, shape and spacing of the clenched hooks 3, as well as the overall length of the lacing 2.

In the illustrated embodiment of the present invention, hook keeper 1 includes a connecting pin clasp or clip 40 (FIGS. 5 and 6) to at least temporarily retain the lateral position of connecting pin 8 with respect to belt lacing 2. Pin clip 40 is located on the outward end 41 of hook keeper 1, and comprises a pair of prongs 42 which are spaced apart a distance sufficient to receive connector pin 8 therebetween. Prongs 42 are oriented generally perpendicular to the web 31 of hook keeper 1, and are elastically deformable for the purpose of crimping the prongs over connecting pin 8, as described in greater detail hereinafter.

The illustrated hook keeper 1 includes three slots 9a, 9b and 9c respectively. Each slot 9 extends completely through the web portion 31 of hook keeper 1, and is oriented therein in a generally side-by-side and parallel relationship. As best illustrated in FIG. 2, each slot 9 has a width which is substantially uniform along the length of the slot, so as to permit hook keeper 1 to be inserted over the loop ends 7 of hooks 3. In the illustrated example, slots 9 are substantially identical in shape, have a generally rectangular plan configuration, and are spaced apart a distance substantially coextensive with the spacing between adjacent hooks 3 on the leading side 18 of belt lacing 2. Slots 9 are sized to closely receive therein the legs 15 and 16 of the clenched hooks 3. In general, the side edges that define the sides of slots 9 serve to releasably engage and abuttingly retain those hooks 3 captured in keeper 1 laterally stationary with respect to the keeper body 30, thereby reinforcing belt lacing 2. Preferably, slots 9 are sized slightly larger than the width of hooks 3 to provide some clearance between keeper 1 and hooks 3, in the nature of 0.002-0.006 inches, to facilitate easy assembly of the keepers 1 onto the hooks 3.

It is to be understood that in the illustrated embodiment of the present invention, hook keeper 1 has at least two slots, but may include more than three slots. Preferably, hook keeper 1 does not extend along a substantial portion of the length of belt lacing 2, such that belt lacing 2 can flex freely in a plane oriented parallel to the ends 11 and 12 of belt 4. In other words, hook keeper 1 may have a much greater length than the length of the illustrated keeper, and may include additional slots to laterally reinforce additional hooks 3 on either side of belt lacing 2. It is preferred that the length of hook keeper 1 be restricted to that which will not interfere substantially with the flexibility of belt lacing 2. In the specific belt illustrated in FIG. 1, the three-slot embodiment of the present invention has been found to be particularly advantageous in prolonging the useful life of belt lacing 2, and avoiding premature failure of the same. In this particular example, it is preferred that the length of hook keeper 1 be no greater than ¼ of the entire length of belt lacing 2. With the four inch wide belt illustrated in FIG. 1, keepers 1 are shown having an overall body length of approximately ½ inch.

In the illustrated example of the present invention, hook keeper 1 has a unitary body construction, and may be manufactured from metal, such as low carbon steel. Keeper 1 may also be constructed from hard plastics, or other similar materials. As illustrated in FIG. 2, hook keeper 1 may be manufactured by stamping a flat blank with pierced slots 9, and then forming the U-shaped body and pin clip 40. In this type of construction, the ends of slots 9 are oriented substantially perpendicular to the faces of flanges 32 and 33.

In operation, at least one hook keeper 1 is used to protect and reinforce hooks 3 in belt lacing 2. One working application of hook keeper 1 is illustrated in FIG. 1, wherein two hook keepers 1 are used to protect and reinforce the outermost hooks 3a and 3b of belt lacing 2. All of the hooks 3 in lacing 2 are initially clenched in the ends of belt 4 in a conventional manner. Before the loop ends 7 of hooks 3 are meshed together, the operator simply inserts two hook keepers 1 over the outermost three hooks 3 on the leading side 18 of belt lacing 2. The two hook keepers 1 are selected to mate with the size and shape of belt lacing 2. The flanges 32 and 33 of hook keepers 1 are oriented to face away from the leading end 5 of belt 4, and pin clips 40 are oriented toward the side edges of belt 4. Hook keepers 1 simply slide freely over the loop ends 7 of the three outermost hooks 3, and are positioned over the legs 15 and 16 thereof. No jigs or lacing machines are required to install the keepers 1 on belt lacing 2.

After hook keepers 1 have been positioned on the leading side 18 of belt lacing 2, the leading and trailing sides 18 and 19 of the belt lacing are meshed together so as to align the respective loop ends 7 of hooks 3. Connector pin 8 is then inserted through the opposing clip prongs 42, and through the loop ends 7 of hooks 3, so that the opposite ends of connecting pin 8 project outwardly from the hook keepers 1. The mating prongs 42 on each clip 40 are then crimped together onto the outer portions of connecting pin 8, as best shown in FIG. 9, so as to fix the lateral position of connecting pin 8 in belt lacing 2, and keep it from migrating. The hooks 3 will eventually form a set or indentation into the exterior of connector pin 8, which in conjunction with the frictional forces therebetween, will securely retain the lateral position of connecting pin in belt lacng 2. Hence, keeper clips 40 need only retain the connector pin 8 in place temporarily, until hooks 3 are set in pin 8.

With the hook keepers 1 securely in place, those forces which act on the outermost hooks 3a and 3b are transmitted to and resisted at least partially by the other hooks captured in the hook keepers 1. Should belt 4 mistrack, and begin to rub against a belt guide or an alignment post, such as the guide 45 diagrammatically illustrated in FIG. 1, keepers 1 protect or shield the outermost hooks 3a and 3b. Any shock loading which is imparted to the outermost hooks 3a and 3b by abutment with belt guide 45 is also shared by the other hooks 3 retained in the associated hook keepers 1. So long as keepers 1 maintain their structural integrity, they positively prevent the outermost hooks 3a and 3b from separating laterally from the belt lacing 2, or pulling off of connector pin 8.

Hook keepers 1 thereby prolong the normal life of belt lacing 2, and prevent premature failure of the same. Hook keepers 1 have a very uncomplicated design, which is inexpensive to manufacture, and particularly easy to install on all types of belt lacings 2. Hook keepers 1 are particularly adapted to be used in field repairs by the operator of the machinery, without the benefit of any special tools or personnel skilled in belt lacing repair.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property of privilege is claimed are defined as follows:

1. In a belt lacing of the type having a plurality of hooks with legs positioned to be clenched in leading and trailing ends of a belt, and loops meshed together with a connecting pin extending therethrough; the improvement comprising:
   at least one hook keeper for reinforcing at least one outermost hook in said lacing; said hook keeper comprising:
     a rigid body;
     at least first and second slots extending completely through said body, and being positioned in a generally side-by-side relationship therein; said first and second slots being shaped to closely receive an associated one of said hooks therethrough;
    said hook keeper body being positioned between said connecting pin and the end of the belt in which said outermost hook is clenched, with the legs of said outermost hook closely received in said first keeper slot, and the legs of a second one of said hooks closely received in said second keeper slot, whereby forces acting on said outermost hook are transmitted to and resisted at least partially by said second hook to improve the strength and longevity of said lacing.

2. A belt lacing as set forth in claim 1, wherein:

said keeper body has a generally U-shaped transverse cross-sectional configuration, defining a web and opposite flanges; and said first and second slots are positioned generally through said web.

3. A belt lacing as set forth in claim 2, wherein:

said lacing includes a leading side positioned for clenching in the leading end of the belt, and a trailing side positioned for clenching in the trailing end of the belt; and said keeper flanges extend away from the leading side of said lacing and cover at least a portion of said hook loops on the trailing side of said lacing to protect the same.

4. A belt lacing as set forth in claim 3, wherein:

said outermost hook is positioned on the leading side of said lacing.

5. A belt lacing as set forth in claim 4, wherein:

said second hook is positioned on the leading side of said lacing, such that said keeper is installed on said hooks before said hook loops are meshed together.

6. A belt lacing as set forth in claim 5, wherein:

said second hook is positioned immediately adjacent to said outermost hook.

7. A belt lacing as set forth in claim 6, wherein:

said first and second slots have a width which is substantially uniform along the length of said slots to permit said keeper to be inserted over the loops of said hooks and positioned on the legs thereof.

8. A belt lacing as set forth in claim 7, wherein:

said keeper body does not extend along a substantial portion of the length of said lacing, whereby said lacing can flex freely in a plane oriented generally parallel to the ends of the belt.

9. A belt lacing as set forth in claim 8, wherein:

said keeper length is no greater than ¼ of the length of said lacing.

10. A belt lacing as set forth in claim 9, wherein:

said keeper body includes a third slot which extends completely through said body, and is positioned adjacent to said second keeper slot in a generally side-by-side relationship therewith; said third keeper slot closely receiving the legs of a third one of said hooks therein to provide additional reinforcement for said lacing.

11. A belt lacing as set forth in claim 10, wherein:

said keeper web has an arcuate shape which generally conforms to the shape of said hook loops.

12. A belt lacing as set forth in claim 11, wherein:

said keeper flanges have opposing interior surfaces that are spaced apart a distance slightly greater than the outside dimension of said hook loops.

13. A belt lacing as set forth in claim 12, wherein:

said keeper flanges are sized to cover the loops of said hooks disposed therebetween to shield the same.

14. A belt lacing as set forth in claim 13, wherein:

said keeper body includes first and second spaced apart prongs at an outer end thereof between which said connector pin is crimped to at least temporarily retain the lateral position of said connector pin in said lacing.

15. A belt lacing as set forth in claim 14, wherein:

said keeper body has a unitary, stamped construction.

16. A belt lacing as set forth in claim 15, wherein:

said keeper body is constructed from a low carbon steel.

17. A belt lacing as set forth in claim 16, including:

a second keeper, being substantially identical in construction to said first-named keeper, and positioned on a second outermost hook on the leading side of said lacing opposite from said first-named keeper.

18. A belt lacing as set forth in claim 1, wherein:

said lacing includes a leading side positioned for clenching in the leading end of the belt, and a trailing side positioned for clenching in the trailing end of the belt; and said keeper includes flanges which extend away from the leading side of said lacing and cover at least a portion of said hook loops on the trailing side of said lacing to protect the same.

19. A belt lacing as set forth in claim 1, wherein:

said lacing includes a leading side positioned for clenching in the leading end of the belt, and a trailing side positioned for clenching in the trailing end of the belt; and said outermost hook is positioned on the leading side of said lacing.

20. A belt lacing as set forth in claim 19, wherein:

said second hook is positioned on the leading side of said lacing, such that said keeper is installed on said hooks before said hook loops are meshed together.

21. A belt lacing as set forth in claim 1, wherein:

said second hook is positioned immediately adjacent to said outermost hook.

22. A belt lacing as set forth in claim 1, wherein:

said first and second slots have a width which is substantially uniform along the length of said slots to permit said keeper to be inserted over the loops of said hooks and positioned on the legs thereof.

23. A belt lacing as set forth in claim 1, wherein:

said keeper body does not extend along a substantial portion of the length of said lacing, whereby said lacing can flex freely in a plane oriented generally parallel to the ends of the belt.

24. A belt lacing as set forth in claim 23, wherein:

said keeper length is no greater than ¼ of the length of said lacing.

25. A belt lacing as set forth in claim 1, wherein:

said keeper body includes a third slot which extends completely through said body, and is positioned adjacent to said second keeper slot in a generally side-by-side relationship therewith; said third keeper slot closely receiving the legs of a third one of said hooks therein to provide additional reinforcement for said lacing.

26. A belt lacing as set forth in claim 1, wherein:

said keeper includes a web having an arcuate shape which generally conforms to the shape of said hook loops.

27. A belt lacing as set forth in claim 1, wherein:

said keeper includes opposite flanges having opposing interior surfaces that are spaced apart a distance slightly greater than the outside dimension of said hook loops.

28. A belt lacing as set forth in claim 1, wherein:

said keeper includes opposite flanges that are sized to cover the loops of said hooks disposed therebetween to shield the same.

29. A belt lacing as set forth in claim 1, wherein:

said keeper body includes first and second spaced apart prongs at an outer end thereof between which said connector pin is crimped to at least temporarily retain the lateral position of said connector pin in said lacing.

30. A belt lacing as set forth in claim 1, wherein:

said keeper body has a unitary, stamped construction.

31. A belt lacing as set forth in claim 1, wherein:
said keeper body is constructed from a low carbon steel.

32. A belt lacing as set forth in claim 1, including:
a second keeper, being substantially identical in construction to said first-named keeper, and positioned on a second outermost hook on the side of said lacing opposite from said first-named keeper, and on a fourth one of said hooks;
said lacing includes a leading side positioned for clenching in the leading end of the belt, and a trailing side positioned for clenching in the trailing end of the belt; and
said first and second-named outermost hooks are positioned on the leading side of said lacing.

33. A belt lacing as set forth in claim 32, wherein:
said second hook and said fourth hook are positioned on the leading side of said lacing immediately adjacent to the first and second-named outermost hooks respectively.

34. A belt lacing as set forth in claim 33, wherein:
said first and second-named keepers each include a third slot which extends completely through said body, and is positioned adjacent to said second keeper slot in a generally side-by-side relationship therewith; said third keeper slot closely receiving the legs of fifth and sixth ones of said hooks therein to provide additional reinforcement for said lacing; said fifth and sixth hooks being positioned immediately adjacent to said second and fourth hooks respectively.

35. A hook keeper for reinforcing belt lacings of the type having a plurality of hooks with legs positioned to be clenched in leading and trailing ends of a belt, and loops meshed together with a connecting pin extending therethrough; said hook keeper comprising:
a rigid body;
at least first and second slots extending completely through said body, and being positioned in a generally side-by-side relationship therein; said first and second slots being shaped to closely receive an associated one of the hooks therethrough;
said hook keeper body being shaped for positioning between the connecting pin and the end of the belt in which the outermost hook is clenched, with an outermost one of the hooks adapted to be closely received in said first keeper slot, and the legs of a second one of said hooks adapted to be closely received in said second keeper slot, whereby forces acting on the outermost hook are transmitted to and resisted at least partially by the second hook to improve the strength and longevity of the lacing.

36. A hook keeper as set forth in claim 35, wherein:
said keeper body has a generally U-shaped transverse cross-sectional configuration, defining a web and opposite flanges;
said first and second slots are positioned generally through said web; and
said flanges are shaped to cover at least a portion of the hook loops clenched in the trailing end of the belt to protect the same.

37. A hook keeper as set forth in claim 36, wherein:
said first and second slots have a width which is substantially uniform along the length of said slots to permit said keeper to be inserted over the loops of said hooks and positioned on the legs thereof.

38. A hook keeper as set forth in claim 37, wherein:
said keeper body has a predetermined length which does not extend along a substantial portion of the length of said lacing, whereby said lacing can flex freely in a plane oriented generally parallel to the ends of the belt.

39. A hook keeper as set forth in claim 38, wherein:
said keeper length is no greater than ¼ of the length of said lacing.

40. A hook keeper as set forth in claim 39, wherein:
said keeper body includes a third slot which extends completely through said body, and is positioned adjacent to said second keeper slot in a generally side-by-side relationship therewith; said third keeper slot being shaped to closely receive the legs of a third one of said hooks therein to provide additional reinforcement for said lacing.

41. A hook keeper as set forth in claim 40, wherein:
said keeper web has an arcuate shape which is adapted to conform to the shape of the hook loops.

42. A hook keeper as set forth in claim 41, wherein:
said keeper flanges have opposing interior surfaces that are spaced apart a predetermined distance that is slightly greater than the outside dimension of the hook loops.

43. A hook keeper as set forth in claim 42, wherein:
said keeper flanges have a predetermined length that is sized to cover the loops of the hooks disposed therebetween to shield the same.

44. A hook keeper as set forth in claim 43, wherein:
said keeper body includes first and second spaced apart prongs at the outer end thereof between which the connector pin is adapted to be crimped to at least temporarily retain the lateral position of the connector pin in the lacing.

45. A hook keeper as set forth in claim 44, wherein:
said keeper body has a unitary, stamped construction.

46. A hook keeper as set forth in claim 45, wherein:
said keeper body is constructed from a low carbon steel.

47. A hook keeper as set forth in claim 46, wherein:
said first, second and third slots are spaced apart from each other a predetermined distance substantially commensurate to the distance between adjacent hooks on the leading end of the belt.

48. A hook keeper as set forth in claim 47, wherein:
said first, second and third slots are substantially identical in shape, with their width being in the range of 0.002–0.006 inches greater than the thickness of the hooks to facilitate keeper installation.

49. A hook keeper as set forth in claim 35, wherein:
said keeper body includes first and second spaced apart prongs at the outer end thereof between which the connector pin is adapted to be crimped to at least temporarily retain the lateral position of the connector pin in the lacing.

50. A hook keeper for reinforcing belt lacings of the type having a plurality of hooks with legs positioned to be clenched in opposite ends of a belt, and loops meshed together with a connecting pin extending therethrough; said hook keeper comprising:
a rigid body;
at least first and second slots extending completely through said body, and being positioned in a generally side-by-side relationship therein; said first and second slots being shaped to closely receive an associated one of the hooks therethrough;
said hook keeper body being shaped for positioning between the connecting pin and one end of the belt, with one of the hooks adapted to be closely received in said first keeper slot, and another one of said hooks adapted to be closely received in said second keeper slot, whereby forces acting on the hooks are transmitted to and resisted at least partially by each other to improve the strength and longevity of the lacing.

51. A belt lacing comprising:

a plurality of hooks having legs clenched in leading and trailing ends of a belt, and loops that are meshed together;

a connecting pin extending through said hook loops to interconnect the leading and trailing ends of the belt;

at least one hook keeper for reinforcing at least one outermost hook in said lacing; said hook keeper comprising:

a rigid body;

at least first and second slots extending completely through said body, and being positioned in a generally side-by-side relationship therein; said first and second slots being shaped to closely receive an associated one of said hooks therethrough; and said hook keeper body being positioned between said connecting pin and the end of the belt in which said outermost hook is clenched, with the legs of said outermost hook closely received in said first keeper slot, and a second one of said hooks closely received in said second keeper slot, whereby forces acting on said outermost hook are transmitted to and resisted at least partially by said second hook to improve the strength and longevity of said lacing.

* * * * *

UNITED STATES PATENT AND TRADEMARK OFFICE
CERTIFICATE OF CORRECTION

PATENT NO. : 4,611,367
DATED : September 16, 1986
INVENTOR(S) : John H. Meulenberg et al.

It is certified that error appears in the above-identified patent and that said Letters Patent is hereby corrected as shown below:

Column 3, line 68:
"ccollectively" should be --collectively--;

Column 6, line 5:
"lacng" should be --lacing--

Signed and Sealed this

Seventh Day of April, 1987

Attest:

DONALD J. QUIGG

Attesting Officer

Commissioner of Patents and Trademarks